United States Patent
Wang et al.

(10) Patent No.: US 9,502,886 B2
(45) Date of Patent: Nov. 22, 2016

(54) MIM CAPACITOR

(71) Applicant: Taiwan Semiconductor Manufacturing Company Limited, Hsin-Chu (TW)

(72) Inventors: Chien-Jung Wang, Hsinchu (TW); Huan-Neng Chen, Taichung (TW); Chewn-Pu Jou, Hsinchu (TW); Chwei-Ching Chiu, HsinChu (TW)

(73) Assignee: Taiwan Semiconductor Manufacturing Company Limited, Hsin-Chu (TW)

( * ) Notice: Subject to any disclaimer, the term of this patent is extended or adjusted under 35 U.S.C. 154(b) by 399 days.

(21) Appl. No.: 14/046,951

(22) Filed: Oct. 5, 2013

(65) Prior Publication Data
US 2014/0265632 A1    Sep. 18, 2014

Related U.S. Application Data

(60) Provisional application No. 61/800,670, filed on Mar. 15, 2013.

(51) Int. Cl.
| | | |
|---|---|---|
| *H01H 35/00* | (2006.01) | |
| *H01H 83/00* | (2006.01) | |
| *H02H 7/16* | (2006.01) | |

(52) U.S. Cl.
CPC ............ *H02H 7/16* (2013.01); *Y10T 307/766* (2015.04)

(58) Field of Classification Search
CPC ........ G06F 1/26; G06F 1/1626; G06F 1/169; G06F 1/206; G06F 1/266; G06F 11/008; G06F 11/0724; G06F 11/076; G06F 11/2028; G06F 11/24; G06F 11/3024; G06F 11/3419; G06F 1/1628; G06F 1/1632
USPC ......................................................... 307/116
See application file for complete search history.

(56) References Cited

U.S. PATENT DOCUMENTS

| | | | | |
|---|---|---|---|---|
| 5,789,964 A | * | 8/1998 | Voldman | H01L 27/0248 327/380 |
| 6,400,231 B1 | * | 6/2002 | Leduc | H03B 5/366 331/116 FE |
| 6,844,771 B1 | * | 1/2005 | Chen | H01L 27/0203 327/379 |
| 8,493,075 B2 | * | 7/2013 | Feng | H03K 19/00369 324/613 |
| 2007/0297120 A1 | * | 12/2007 | Ren | H01L 23/5225 361/309 |
| 2011/0102217 A1 | * | 5/2011 | Hsu | H03M 1/1042 341/120 |

OTHER PUBLICATIONS

Corresponding Chinese application 201310695758.7, Chinese office action dated Jul. 1, 2016.

* cited by examiner

*Primary Examiner* — Jared Fureman
*Assistant Examiner* — Esayas Yeshaw
(74) *Attorney, Agent, or Firm* — Cooper Legal Group, LLC (57) ABSTRACT

One or more systems and techniques for managing one or more electronic devices are provided. A determination is made that a first capacitor in a set of one or more capacitors has a defect. Responsive to the determination, the first capacitor is disabled, and a second capacitor is enabled.

20 Claims, 7 Drawing Sheets

MIM CAPACITOR

BACKGROUND

Some circuits are configured to couple one or more electrical components to one or more other electrical components. Such circuits are commonly found in circuitry of various devices, such as personal computers and cellular phones. Such circuits are also commonly found in memory circuitry.

DETAILED DESCRIPTION

The claimed subject matter is now described with reference to the drawings, wherein like reference numerals are generally used to refer to like elements throughout. In the following description, for purposes of explanation, numerous specific details are set forth in order to provide an understanding of the claimed subject matter. It is evident, however, that the claimed subject matter can be practiced without these specific details. In other instances, structures and devices are illustrated in block diagram form in order to facilitate describing the claimed subject matter.

One or more circuits and one or more techniques for using such circuits, for example, are provided herein.

According to an aspect of the instant disclosure, a method for managing one or more capacitors is provided. In some embodiments, the method comprises determining that a first capacitor in a set of one or more capacitors has a defect. According to some embodiments, the defect is associated with a short circuit. In some embodiments, the method comprises, responsive to the determination, disabling the first capacitor and enabling a second capacitor. In some embodiments, the second capacitor is disabled prior to the determination that the first capacitor has the defect. In some embodiments, the second capacitor is selected to be enabled based upon a location of the defect. In some embodiments, the second capacitor is charged to a voltage source, such as VDD, prior to the determination that the first capacitor has the defect. In some embodiments, the disabling the first capacitor comprises isolating the first capacitor.

In some embodiments, the disabling the first capacitor comprises turning off a transistor. In some embodiments, the transistor comprises an n-type metal-oxide semiconductor field-effect transistor (nMOSFET). In some embodiments, one or more transistors comprise at least one of a p-type metal-oxide semiconductor field-effect transistor (pMOSFET), an insulated gate bipolar transistor (IGBT), a bipolar junction transistor (BJT), or a field-effect transistor (FET).

In some embodiments, at least one of the first capacitor or the second capacitor comprises a High Density (HD) Metal-Insulator-Metal (MiM) capacitor.

In some embodiments, a determination is made that the second capacitor has a second defect. In some embodiments, the second defect is a second short circuit or is not a short circuit. In response to determining that the second capacitor has the second defect, the second capacitor is disabled, and a third capacitor is enabled. In some embodiments, the third capacitor is different than the first capacitor and is different than the second capacitor.

In some embodiments, a number of one or more capacitors that are associated with one or more defects is counted. In some embodiments, the counting is performed using a thermometer detector.

According to an aspect of the instant disclosure, a system is provided. The system comprises a first capacitor, a second capacitor, and a thermometer detector. The first capacitor is coupled to a transistor, which is coupled to a voltage source. In some embodiments, the transistor is part of a switch, and the switch is coupled to the voltage source and the first capacitor. The second capacitor is configured to be enabled responsive to determining that the first capacitor has a defect. The thermometer detector is configured to count a number of capacitors in a set of one or more capacitors that are associated with one or more defects, where the first capacitor is counted in the number. In some embodiments, the thermometer detector is coupled to at least one of the first capacitor or the second capacitor. In some embodiments, the thermometer detector is configured to provide at least one of a first output or a second output. In some embodiments, the first output is 0, and the second output is 1. In some embodiments, the first output corresponds to a request to turn on one or more capacitors, such as one or more redundant capacitors. In some embodiments, the second output corresponds to a request to turn off one or more capacitors, such as one or more redundant capacitors. It is to be appreciated that an output of the thermometer detector is based upon at least one of whether one or more capacitors are determined to have a defect or a count of the one or more capacitors that are determined to have a defect.

In some embodiments, the first capacitor is disabled in response to the determination that the first capacitor has a defect. In some embodiments, the disabling of the first capacitor comprises or is associated with turning off at least one of the transistor that is coupled to the first capacitor or the voltage source. In some embodiments, the turning off of the transistor is performed using a logic circuit. In some embodiments, the logic circuit comprises a gate, such as at least one of an AND gate, an OR gate, or an inverter. In some embodiments, responsive to determining that the second capacitor has a second defect, at least one of a third capacitor is enabled or the second capacitor is disabled. In some embodiments, responsive to the determination that the second capacitor has the second defect, a second transistor that is coupled to the second capacitor and a second voltage source or connects the second capacitor the second voltage source is turned off. The turning off of the second transistor is performed using a second logic circuit. In some embodiments, the second logic circuit comprises a second gate, such as at least one of an AND gate, an OR gate, or a second inverter.

Figure 1:
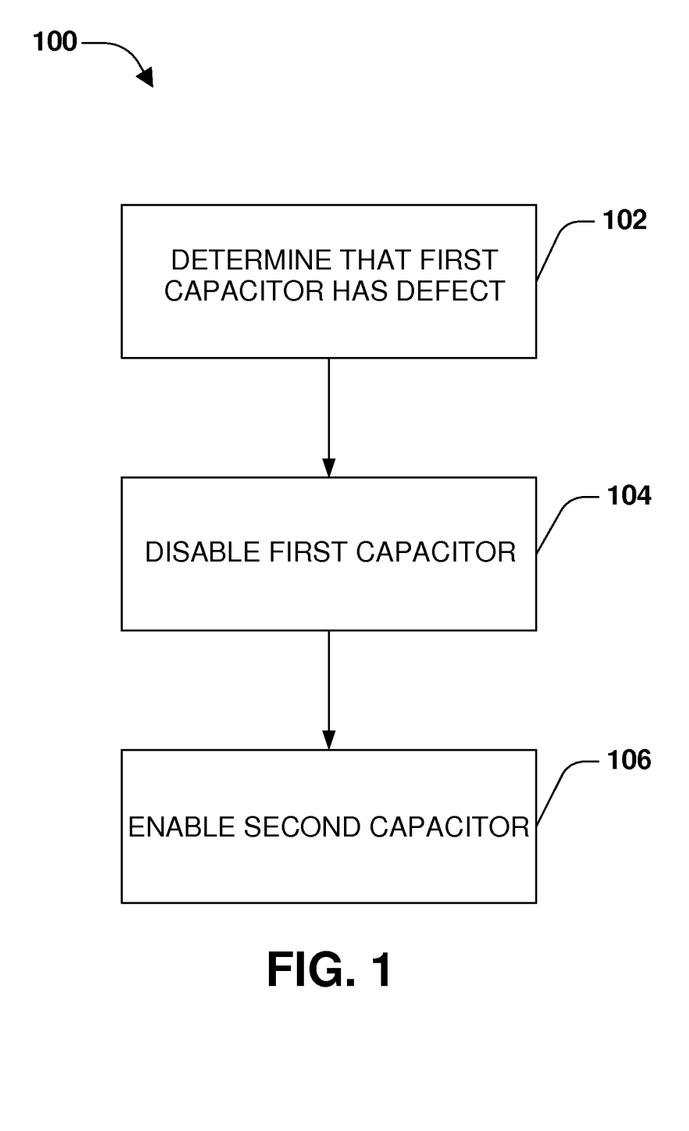
FIG. 1 is a flow diagram illustrating a method of managing one or more electronic devices, according to some embodiments.

A method 100 of managing one or more electronic devices, according to some embodiments, is illustrated in FIG. 1, and one or more circuits used to implement such a methodology are illustrated in FIG. 3A, FIG. 3B, FIG. 4, FIG. 5, FIG. 6 and FIG. 7. At 102, a determination is made that a first capacitor has a defect. At 104, the first capacitor is disabled. In some embodiments, the disabling of the first capacitor is performed responsive to the determination that the first capacitor has the defect. At 106, a second capacitor is enabled. In some embodiments, the enabling of the second capacitor is performed responsive to at least one of the determination that the first capacitor has the defect or the disabling of the first capacitor.

Figure 2:
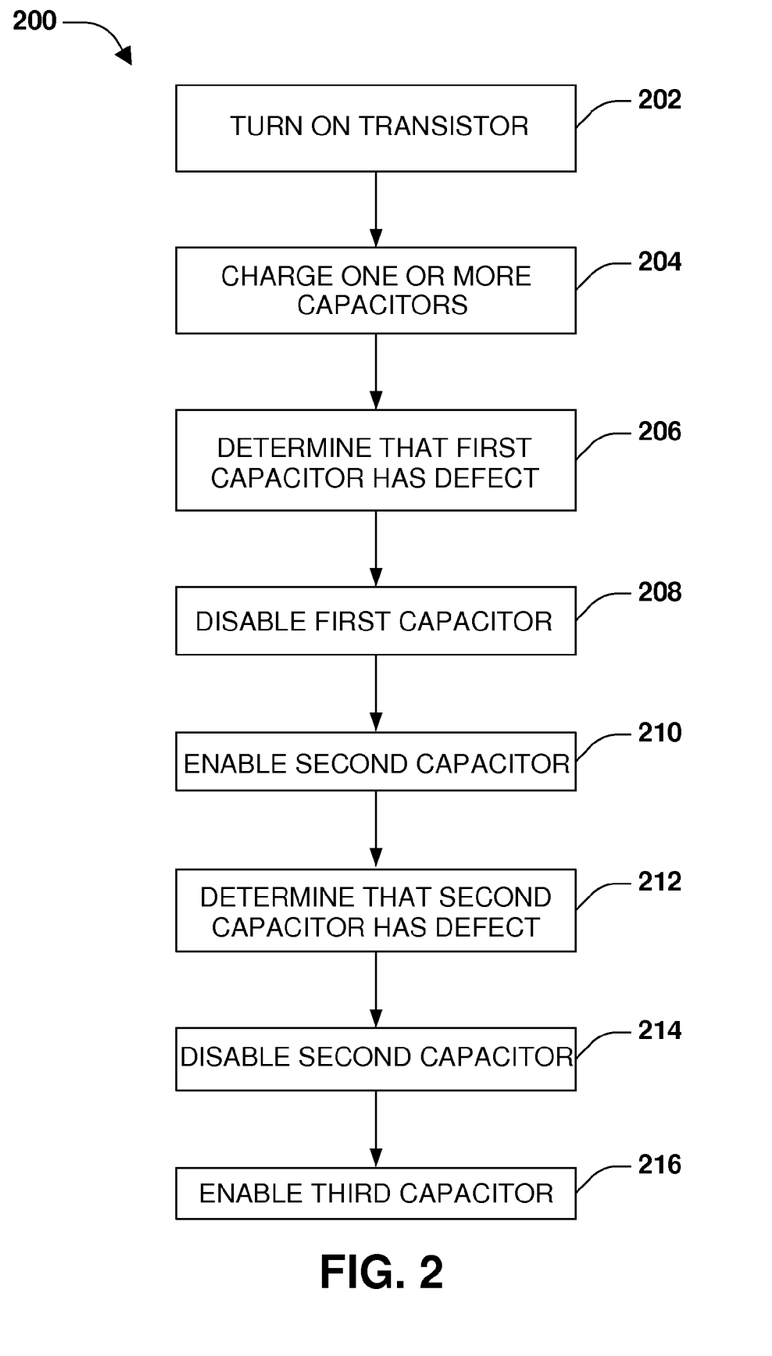
FIG. 2 is a flow diagram illustrating a method of managing one or more electronic devices, according to some embodiments.

A method 200 of managing one or more electronic devices, according to some embodiments, is illustrated in FIG. 2, and one or more circuits used to implement such a methodology are illustrated in FIG. 3A, FIG. 3B, FIG. 4, FIG. 5, FIG. 6 and FIG. 7. At 202, a transistor is turned on. In some embodiments, the transistor comprises a pMOS-FET. The transistor is coupled to a first capacitor. At 204, one or more capacitors are charged. The one or more capacitors comprise the first capacitor, a second capacitor and a third capacitor in some embodiments. At 206, a determination is made that the first capacitor has a defect. At 208, the first capacitor is disabled. In some embodiments, the disabling of the first capacitor is performed responsive to the determination that the first capacitor has the defect. At 210, the second capacitor is enabled. In some embodiments, the enabling of the second capacitor is performed responsive to at least one of the determination that the first capacitor has the defect or the disabling of the first capacitor. At 212, a determination is made that the second capacitor has a defect. At 214, the second capacitor is disabled. In some embodiments, the disabling of the second capacitor is performed responsive to the determination that the second capacitor has the defect. At 216, the third capacitor is enabled. In some embodiments, the enabling of the third capacitor is performed responsive to at least one of the determination that the second capacitor has the defect or the disabling of the second capacitor.

Figure 3A:
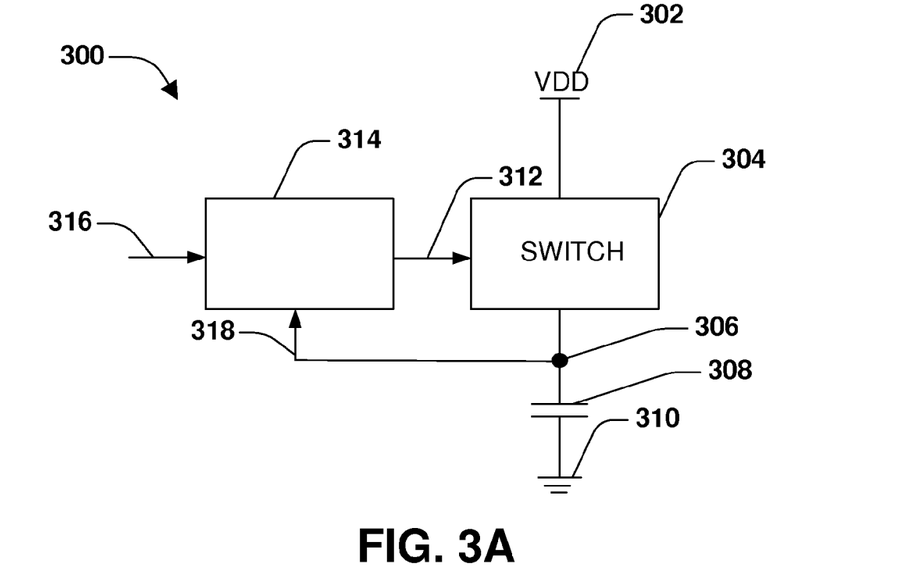
FIG. 3A is an illustration of one or more electronic devices, according to some embodiments.

A system 300 comprising an electronic device, according to some embodiments, is illustrated at least in part in FIG. 3A. The system 300 comprises a switch 304, a capacitor 308 and a device 314, and is coupled to a voltage source 302. The voltage source 302 is coupled to the switch 304. The switch 304 is configured to be activated when functioning properly and deactivated when a defect occurs, in some embodiments. The switch 304 is coupled to the capacitor 308. The capacitor 308 is coupled to ground 310. A node 306 is located between the switch 304 and the capacitor 308 in some embodiments. The node 306 is connected to the device 314. In some embodiments, the node 306 provides a signal 318 to the device 314. The signal 318 provided to the device 314 corresponds to a detection associated with the capacitor 308 in some embodiments. The device 314 is coupled to the switch 304. In some embodiments, the device 314 provides a signal 312 to the switch 304. The signal 312 provided to the switch 304 corresponds to whether the switch 304 is activated or deactivated in some embodiments. In some embodiments, the device 314 is configured to receive a signal 316. The signal 316 corresponds to an initial set which is associated with activating or deactivating the switch 304, in some embodiments.

Figure 3B:
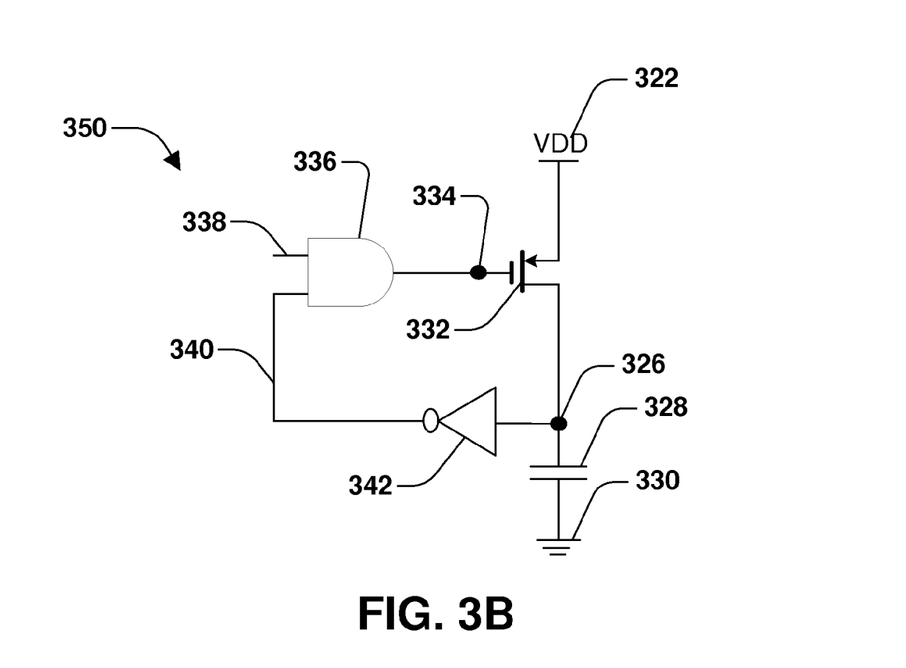
FIG. 3B is an illustration of one or more electronic devices, according to some embodiments.

A system 350 comprising an electronic device, according to some embodiments, is illustrated at least in part in FIG. 3B. The system 350 illustrated in FIG. 3B is similar or substantially the same as the system 300 illustrated in FIG. 3A. The system 350 comprises a capacitor 328, a transistor 332, a first logic gate 336 and a second logic gate 342, and is coupled to a voltage source 322. In some embodiments, at least one of the transistor 332 or the first logic gate 336 corresponds to or is similar to the switch 304 of FIG. 3A. In some embodiments, at least one of the first logic gate 336 or the second logic gate 342 corresponds to or is similar to the device 314 of FIG. 3A. The first logic gate 336 comprises an AND logic gate in some embodiments. The second logic gate 342 comprises a NOT logic gate in some embodiments. The voltage source 322 is coupled to the transistor 332. The transistor 332 is configured to be activated when functioning properly and deactivated when a defect occurs, in some embodiments. The transistor 332 is coupled to the capacitor 328. The capacitor 328 is coupled to ground 330. A node 326 is located between the transistor 332 and the capacitor 328 in some embodiments. The node 326 is connected to the second logic gate 342. In some embodiments, the node 326 provides a signal to the second logic gate 342. The signal provided to the second logic gate 342 corresponds to a detection associated with the capacitor 328 in some embodiments. The second logic gate 342 is coupled to the first logic gate 336 via a path 340. In some embodiments, the first logic gate 336 provides a signal via node 334 to the transistor 332. The signal provided to the transistor 332 corresponds to whether the transistor 332 is activated or deactivated in some embodiments. In some embodiments, the first logic gate 336 is configured to receive a signal via path 338. The signal received via the path 338 corresponds to an initial set which is associated with activating or deactivating the transistor 332 in some embodiments.

Figure 4:
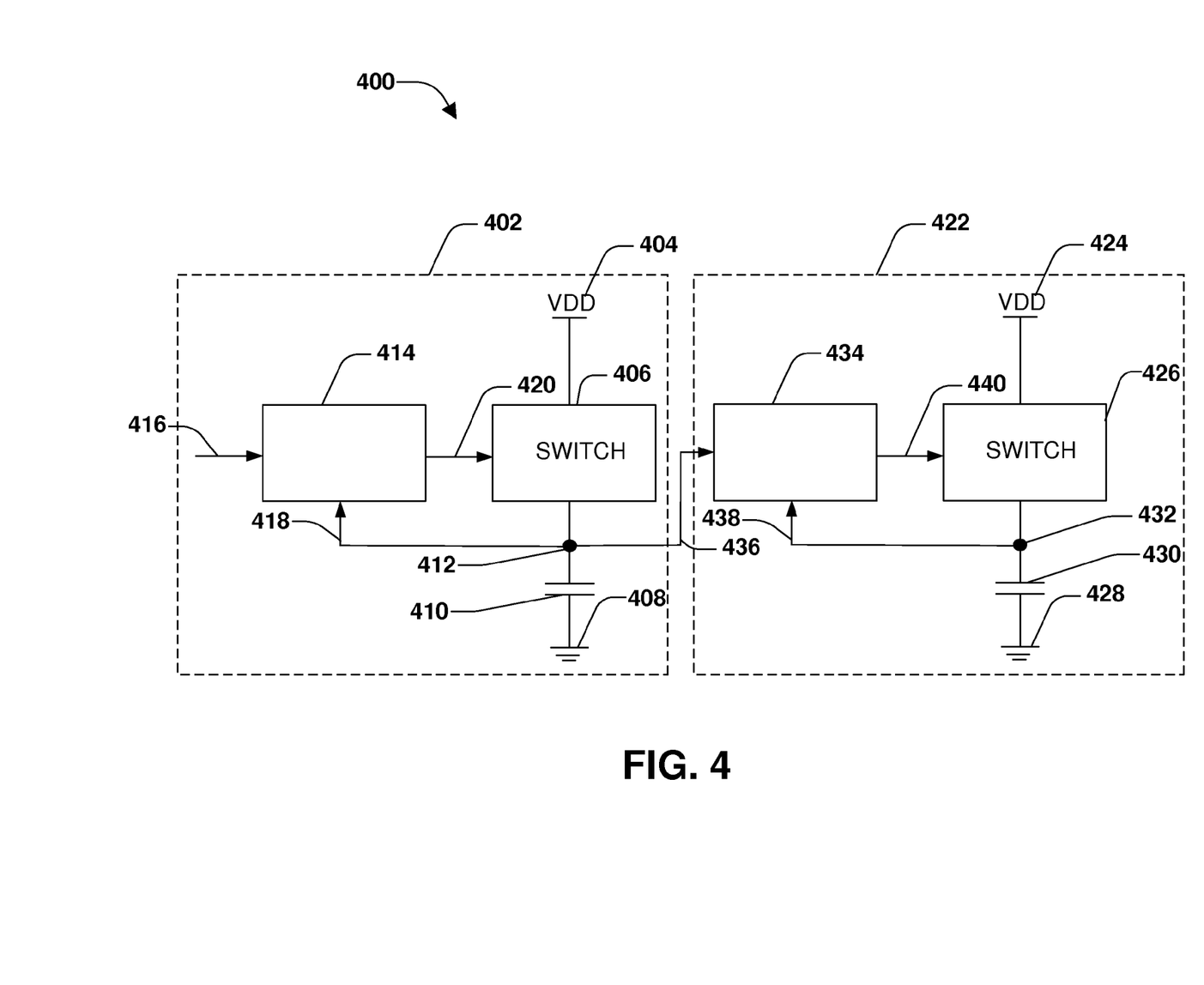
FIG. 4 is an illustration of one or more electronic devices, according to some embodiments.

A system 400 comprising a first electronic device 402 and a second electronic device 422, according to some embodiments, is illustrated at least in part in FIG. 4.

The first electronic device 402 comprises a switch 406, a capacitor 410 and a device 414, and is coupled to a voltage source 404. The voltage source 404 is coupled to the switch 406. The switch 406 is configured to be activated when functioning properly and deactivated when a defect occurs, in some embodiments. The switch 406 is coupled to the capacitor 410. The capacitor 410 is coupled to ground 408. A node 412 located between the switch 406 and the capacitor 410, in some embodiments. The node 412 is connected to the device 414. In some embodiments, the node 412 provides a signal 418 to the device 414. The signal 418 provided to the device 414 corresponds to a detection associated with the capacitor 410 in some embodiments. The device 414 is coupled to the switch 406. In some embodiments, the device 414 provides a signal 420 to the switch 406. The signal 420 provided to the switch 406 corresponds to whether the switch 406 is activated or deactivated, in some embodiments. In some embodiments, the device 414 is configured to receive a signal 416. The signal 416 corresponds to an initial set which is associated with activating or deactivating the switch 406, in some embodiments.

The second electronic device 422 comprises a switch 426, a capacitor 430 and a device 434, and is coupled to a voltage source 424. The voltage source 424 is coupled to the switch 426. The switch 426 is configured to be activated when functioning properly and deactivated when a defect occurs, in some embodiments. The switch 426 is coupled to the capacitor 430. The capacitor 430 is coupled to ground 428. A node 432 located between the switch 426 and the capacitor 430 in some embodiments. The node 432 is connected to the device 434. In some embodiments, the node 432 provides a signal 438 to the device 434. The signal 438 provided to the device 434 corresponds to a detection associated with the capacitor 430 in some embodiments. The device 434 is coupled to the switch 426. In some embodiments, the device 434 provides a signal 440 to the switch 426. The signal 440 provided to the switch 426 corresponds to whether the switch 426 is activated or deactivated in some embodiments. In some embodiments, the device 434 is configured to receive a signal 436. In some embodiments, the signal 436 corresponds to an initial set which is associated with activating or deactivating the switch 426. The signal 436, in some embodiments, is received by the device 434 from the node 412 of the first electronic device 422. In some embodiments, the signal 436 is provided from the node 412 of the first electronic device 422 based upon a determination that the capacitor 410 or one or more other portions of the first electronic device 402 is defective.

Figure 5:
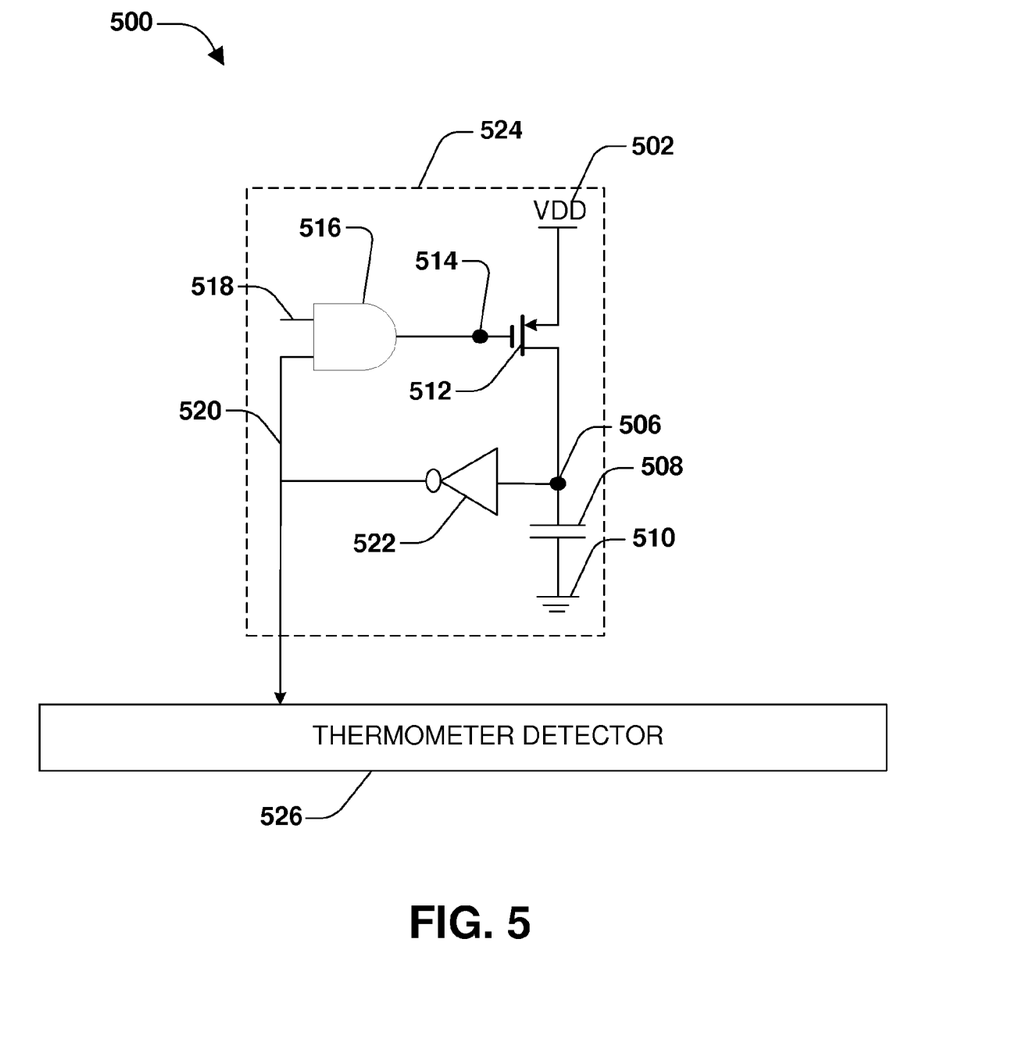
FIG. 5 is an illustration of one or more electronic devices, according to some embodiments.

A system 500 comprising a first electronic device 524 and a thermometer detector 526, according to some embodiments, is illustrated at least in part in FIG. 5. The first electronic device 524 illustrated in FIG. 5 is similar or substantially the same as the system 350 illustrated in FIG. 3B.

The first electronic device 524 comprises a capacitor 508, a transistor 512, a first logic gate 516 and a second logic gate 522, and is coupled to a voltage source 502. The first logic gate 516 comprises an AND logic gate in some embodiments. The second logic gate 522 comprises a NOT logic gate in some embodiments. The voltage source 502 is coupled to the transistor 512. The transistor 512 is configured to be activated when functioning properly and deactivated when a defect occurs, in some embodiments. The transistor 512 is coupled to the capacitor 508. The capacitor 508 is coupled to ground 510. A node 506 located between the transistor 512 and the capacitor 508 in some embodiments. The node 506 is connected to the second logic gate 522. In some embodiments, the node 506 provides a signal to the second logic gate 522. The signal provided to the second logic gate 522 corresponds to a detection associated with the capacitor 508 in some embodiments. The second logic gate 522 is coupled to the first logic gate 516. In some embodiments, the first logic gate 516 provides a signal via node 514 to the transistor 512. The signal provided to the transistor 512 corresponds to whether the transistor 512 is activated or deactivated in some embodiments. In some embodiments, the first logic gate 516 is configured to receive a signal via path 518. The signal received via the path 518 corresponds to an initial set which is associated with activating or deactivating the transistor 512 in some embodiments.

The thermometer detector 526 is coupled to the first electronic device 524, and at least one of sends a signal to or receives a signal from 520 the first electronic device 524. In some embodiments, the thermometer detector 526 counts a first number of capacitors that are at least one of defective or failed. In some embodiments, the thermometer detector 526 turns on one or more capacitors through one or more OR gates. The one or more capacitors turned on by the thermometer detector 526 corresponds to the first number of capacitors determined to be at least one of defective or failed, in some embodiments.

Figure 6:
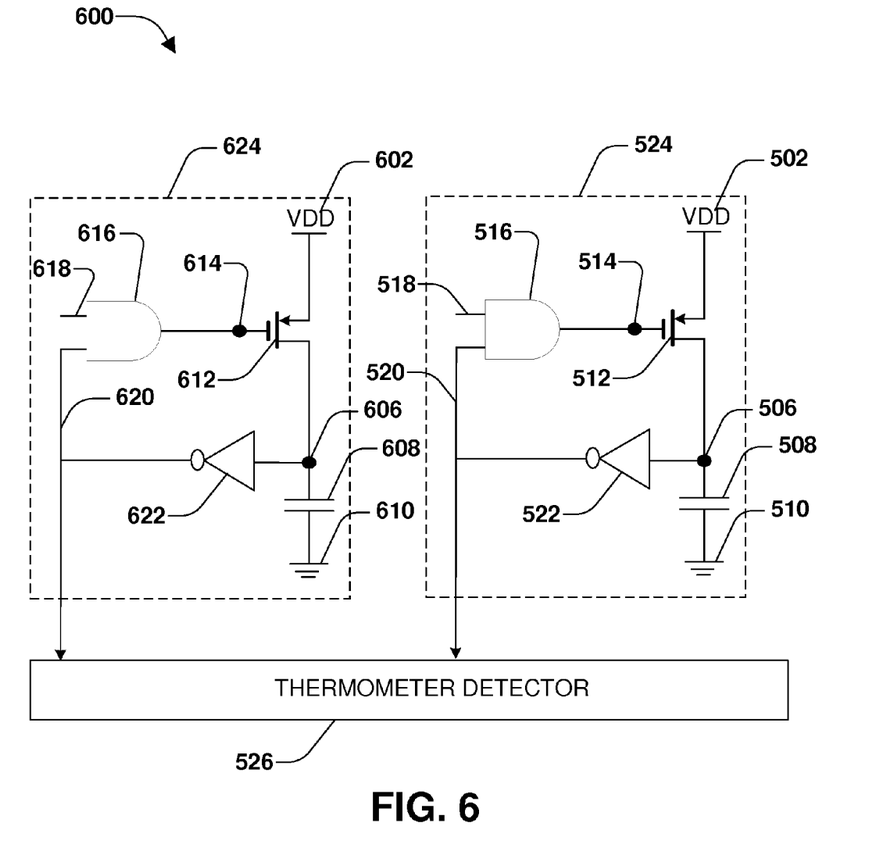
FIG. 6 is an illustration of one or more electronic devices, according to some embodiments.

A system 600 comprising the first electronic device 524 illustrated in FIG. 5, the thermometer detector 526 illustrated in FIG. 5, and a second electronic device 624, according to some embodiments, is illustrated at least in part in FIG. 6.

The second electronic device 624 comprises a capacitor 608, a transistor 612, a first logic gate 616 and a second logic gate 622, and is coupled to a voltage source 602. The first logic gate 616 comprises an AND logic gate in some embodiments. The second logic gate 622 comprises a NOT logic gate in some embodiments. The voltage source 602 is coupled to the transistor 612. The transistor 612 is configured to be activated when functioning properly and deactivated when a defect occurs, in some embodiments. The transistor 612 is coupled to the capacitor 608. The capacitor 608 is coupled to ground 610. A node 606 located between the transistor 612 and the capacitor 608 in some embodiments. The node 606 is connected to the second logic gate 622. In some embodiments, the node 606 provides a signal to the second logic gate 622. The signal provided to the second logic gate 622 corresponds to a detection associated with the capacitor 608 in some embodiments. The second logic gate 622 is coupled to the first logic gate 616. In some embodiments, the first logic gate 616 provides a signal via node 614 to the transistor 612. The signal provided to the transistor 612 corresponds to whether the transistor 612 is activated or deactivated in some embodiments. In some embodiments, the first logic gate 616 is configured to receive a signal via path 618. The signal received via the path 618 corresponds to an initial set which is associated with activating or deactivating the transistor 612 in some embodiments.

The thermometer detector 526 is coupled to the second electronic device 624 as well as the first electronic device 524. The thermometer detector 526 at least one of sends a signal to or receives a signal from 520 the first electronic device 524, and at least one of sends a signal to or receives a signal from 620 the second electronic device 624. In some embodiments, the thermometer detector 526 counts a first number of capacitors that are determined to have a defect. The thermometer detector 526 determines that a capacitor has a defect based upon an input received by the thermometer detector 526 from the capacitor. In some embodiments, an input of 0 indicates that the capacitor does not have a defect, while an input of 1 indicates that the capacitor does have a defect. It is appreciated that in some embodiments, an electronic device is determined to not have a defect if a capacitor that is part of the electronic device does not have a defect, while the electronic device is determined to have a defect if the capacitor that is part of the electronic device does have a defect. In some embodiments, the thermometer detector 526 receives a first input from the first electronic device 524, where the first input is 0. Based upon the first input, the thermometer detector determines that the first electronic device 524 and the capacitor 508 that is part of the first electronic device 524 does not have a defect. In some embodiments, the thermometer detector 526 receives a second input from the second electronic device 624, where the first input is 1. Based upon the second input, the thermometer detector determines that the second electronic device 624 and the capacitor 608 that is part of the second electronic device 624 does have a defect.

Figure 7:
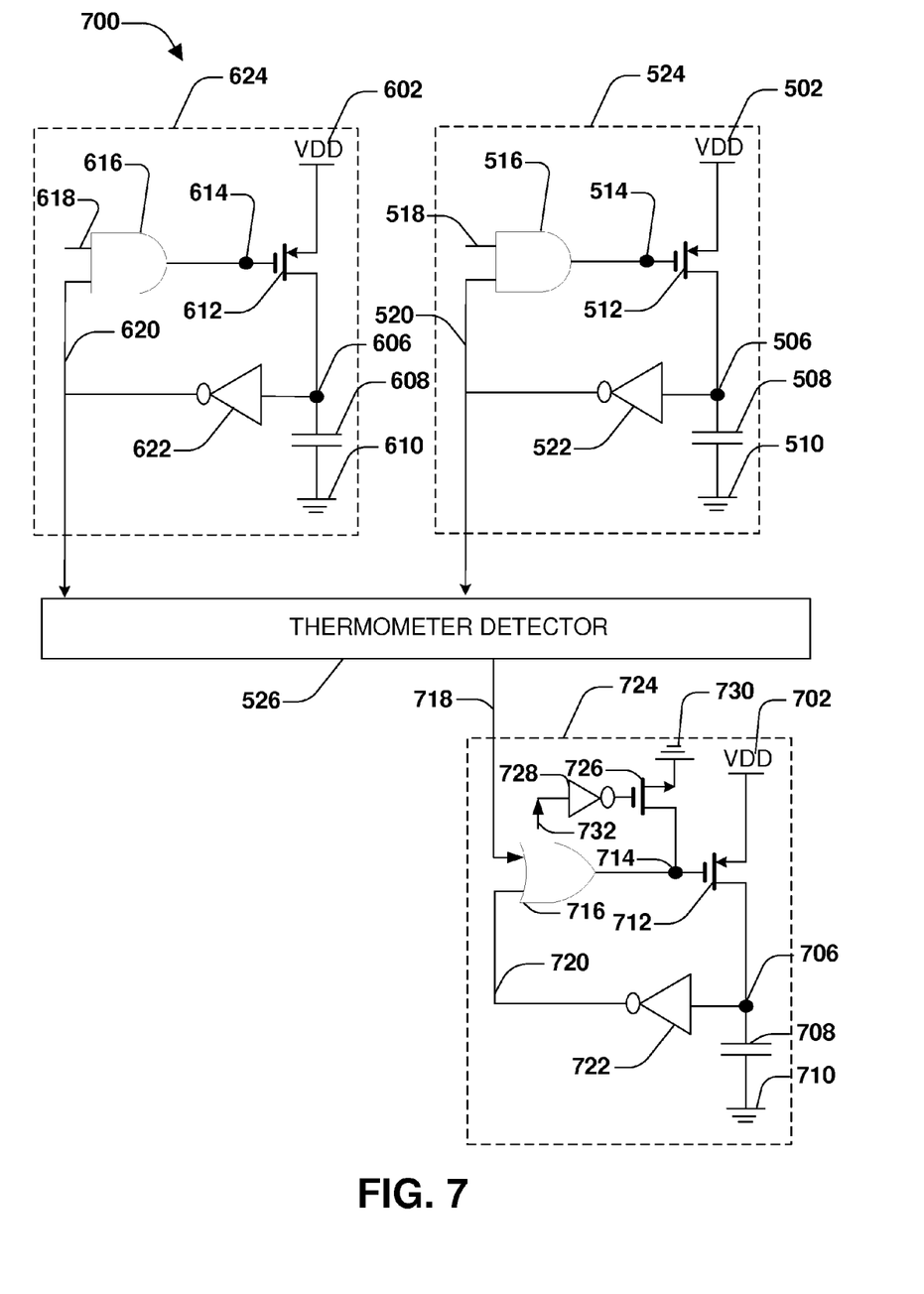
FIG. 7 is an illustration of one or more electronic devices, according to some embodiments.

A system 700 comprising the first electronic device 524 illustrated in FIG. 5 and FIG. 6, the thermometer detector 526 illustrated in FIG. 5 and FIG. 6, the second electronic device 624 illustrated in FIG. 6, and a third electronic device 724, according to some embodiments, is illustrated at least in part in FIG. 7.

The third electronic device 724 comprises a capacitor 708, a transistor 712, a first logic gate 716 and a second logic gate 722, and is coupled to a voltage source 702. The first logic gate 716 comprises an OR logic gate in some embodiments. The second logic gate 722 comprises a NOT logic gate in some embodiments. The voltage source 702 is coupled to the transistor 712. The transistor 712 is configured to be activated when functioning properly and deactivated when a defect occurs, in some embodiments. The transistor 712 is coupled to the capacitor 708. The capacitor 708 is coupled to ground 710. A node 706 located between the transistor 712 and the capacitor 708 in some embodiments. The node 706 is connected to the second logic gate 722. In some embodiments, the node 706 provides a signal to the second logic gate 722. The signal provided to the second logic gate 722 corresponds to a detection associated with the capacitor 708 in some embodiments. The second logic gate 722 is coupled to the first logic gate 716. In some embodiments, the first logic gate 716 provides a signal via node 714 to the transistor 712. The signal provided to the transistor 712 corresponds to whether the transistor 712 is activated or deactivated in some embodiments. In some embodiments, the first logic gate 716 is configured to receive a signal via path 718. The signal received via the path 718 corresponds to an initial set which is associated with activating or deactivating the transistor 712 in some embodiments. The node 714 is coupled to a second transistor 726. The second transistor 726 is coupled to ground 730. The second transistor 726 is further coupled to third logic gate 728 in some embodiments. The third logic gate 728 comprises a NOT logic gate in some embodiments. In some embodiments, the third logic gate 728 is configured to receive a signal via path 732. The signal received via the path 732 corresponds to a set which is associated with activating or deactivating the transistor 726 in some embodiments.

The thermometer detector 526 is coupled to the third electronic device 724 as well as the second electronic device 624 and the first electronic device 524. The thermometer detector 526 at least one of sends a signal to or receives a signal from 520 the first electronic device 524, and at least one of sends a signal to or receives a signal from 620 the second electronic device 624. In some embodiments, the thermometer detector 526 counts a first number of capacitors that are determined to have a defect. The thermometer detector 526 determines that a capacitor has a defect based upon an input received by the thermometer detector 526 from the capacitor. In some embodiments, an input of 0 indicates that the capacitor does not have a defect, while an input of 1 indicates that the capacitor does have a defect. It is appreciated that in some embodiments, an electronic device is determined to not have a defect if a capacitor that is part of the electronic device does not have a defect, while the electronic device is determined to have a defect if the capacitor that is part of the electronic device does have a defect. In some embodiments, the thermometer detector 526 receives a first input from the first electronic device 524, where the first input is 0. Based upon the first input, the thermometer detector determines that the first electronic device 524 and the capacitor 508 that is part of the first electronic device 524 does not have a defect. In some embodiments, the thermometer detector 526 receives a second input from the second electronic device 624, where the second input is 1. Based upon the second input, the thermometer detector determines that the second electronic device 624 and the capacitor 608 that is part of the second electronic device 624 does have a defect.

In some embodiments, the thermometer detector 526 provides a first output or a second output based upon the first number of capacitors that are determined to have a defect. The first output is 0 and the second output is 1, in some embodiments. In some embodiments, based upon the determination that the second electronic device 624 and the capacitor 608 that is part of the second electronic device 624 does have a defect, the thermometer detector 526 provides the first output to the first logic gate 716 via the path 718. Based upon the first output, the transistor 712 is activated and the capacitor 708 is turned on. If the second electronic device 624 and the capacitor 608 that is part of the second electronic device 624 were determined to not have a defect, it is appreciated that the thermometer detector 526 would provide the second output to the first logic gate 716 via the path 718. Based upon the second output, the transistor 712 would be deactivated and the capacitor 708 would be turned off. It is appreciated that in some embodiments, after the capacitor 708 has been turned on, responsive to determining that the third electronic device 724 or the capacitor 708 has a defect, the thermometer detector 526 is configured to provide the second output to the first logic gate 716 via the path 718 to deactivate the transistor 712 and to turn off the capacitor 708.

It is appreciated that in some embodiments, the thermometer detector 526 counts a second number of capacitors comprising two or more capacitors that are determined to have a defect. The thermometer detector 526 turns on a number of other capacitors, where the number of other capacitors turned on by the thermometer detector 526 corresponds to the second number of capacitors that are determined to have a defect. In some embodiments, if the thermometer detector 526 counts a first capacitor and a second capacitor as having a defect, the thermometer detector 526 turns on a third capacitor and a fourth capacitor. The thermometer detector turns on the third capacitor by providing a first output to a first logic gate that is part of an electronic device comprising the third capacitor, and turns on the fourth capacitor by providing the first output to a second logic gate that is part of a second electronic device comprising the fourth capacitor. In some embodiments, the first output is 0, the first logic gate is an OR gate, and the second logic gate is an OR gate.

According to an aspect of the instant disclosure, a method for managing one or more capacitors is provided. The method comprises determining that a first capacitor in a set of one or more capacitors has a defect. The method further comprises, responsive to the determination, disabling the first capacitor, and enabling a second capacitor.

According to an aspect of the instant disclosure, a system is provided. The system comprises a first capacitor, a second capacitor and a thermometer detector. The first capacitor is coupled to a transistor coupled to a voltage source. The second capacitor is configured to be enabled responsive to determining that the first capacitor has a defect. The thermometer detector is configured to count a number of capacitors in a set of one or more capacitors that are associated with one or more defects, where the first capacitor is counted in the number.

According to an aspect of the instant disclosure, a system is provided. The system comprises a first electronic device, a second electronic device and a thermometer detector. The second electronic device is configured to be enabled responsive to determining that the first electronic device has a defect. The thermometer detector is configured to be coupled to the first electronic device and is configured to count a number of electronic devices in a set of one or more electronic device that are associated with one or more defects, where the first capacitor is counted in the number.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

It will be appreciated that layers, features, elements, etc. depicted herein are illustrated with particular dimensions relative to one another, such as structural dimensions or orientations, for example, for purposes of simplicity and ease of understanding and that actual dimensions of the same differ substantially from that illustrated herein, in some embodiments. Additionally, a variety of techniques exist for forming the layers features, elements, etc. mentioned herein, such as etching techniques, implanting techniques, doping techniques, spin-on techniques, sputtering techniques such as magnetron or ion beam sputtering, growth techniques, such as thermal growth or deposition techniques such as chemical vapor deposition (CVD), physical vapor deposition (PVD), plasma enhanced chemical vapor deposition (PECVD), or atomic layer deposition (ALD), for example.

Further, unless specified otherwise, "first," "second," or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally to be construed to mean "one or more" unless specified otherwise or clear from context to be directed to a singular form. Also, at least one of A and B or the like generally means A or B or both A and B. Furthermore, to the extent that "includes", "having", "has", "with", or variants thereof are used, such terms are intended to be inclusive in a manner similar to "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for managing one or more capacitors, comprising:
   determining that a first capacitor in a set of one or more capacitors has a defect when a first signal at a node to which the first capacitor is coupled has a first logic state; and
   responsive to the determination:
      disabling the first capacitor; and
      applying the first signal having the first logic state to a first logic gate to toggle a first gate signal that is output by the first logic gate from a first non-enabling logic state to a first enabling logic state, wherein the first enabling logic state turns on a first transistor to enable a second capacitor.

2. The method of claim 1, at least one of the first capacitor or the second capacitor comprising an HD MiM capacitor.

3. The method of claim 1, the second capacitor at least one of:
   disabled prior to the determination; or
   charged to a specified voltage prior to the determination.

4. The method of claim 1, comprising:
   determining that the second capacitor has a second defect; and
   responsive to the determination that the second capacitor has the second defect:
      disabling the second capacitor; and
      enabling a third capacitor.

5. The method of claim 1, the defect corresponding to a short circuit.

6. The method of claim 1, the disabling comprising turning off a second transistor having a first source/drain region coupled to the node.

7. The method of claim 6, the disabling comprising
   applying the first signal having the first logic state to an inverter; and
   applying, by the inverter, a second signal having a second logic state, which is an inversion of the first logic state, to a second logic gate to toggle a second gate signal that is output by the second logic gate from a second enabling logic state to a second non-enabling logic state, wherein the second non-enabling logic state turns off the second transistor to disable the first capacitor.

8. A system comprising:
   a first capacitor coupled to a first node;
   a first transistor having a first source/drain region coupled to the first node and a second source/drain region coupled to a voltage source;
   a first logic gate having a first input coupled to the first node;
   a second transistor having a gate coupled to an output of the first logic gate and a first source/drain region coupled to a second node; and
   a second capacitor coupled to the second node and enabled responsive to the first logic gate determining that the first capacitor has a defect.

9. The system of claim 8, comprising:
   an inverter coupled to the first node; and
   a second logic gate having a first input coupled to the inverter.

10. The system of claim 9, the second logic gate having an output coupled to a gate of the first transistor.

11. The system of claim 10, the second logic gate configured to output a gate signal having a non-enabling logic state to turn off the first transistor responsive to the determination.

12. The system of claim 8, comprising:
an inverter coupled to the second node and coupled to a second input of the first logic gate.

13. The system of claim 8, wherein the first logic gate is an AND gate.

14. The system of claim 8, the second transistor having a second source/drain region coupled to the voltage source.

15. The system of claim 8, comprising a third capacitor configured to be enabled responsive to determining that the second capacitor has a second defect.

16. A system comprising:
a first electronic device comprising a first logic gate having a first input coupled to a first capacitor;
a second electronic device comprising a second logic gate and configured to be enabled responsive to determining that the first electronic device has a defect; and
a thermometer detector coupled to the first electronic device and configured to count a number of electronic devices in a set of one or more electronic devices that are associated with one or more defects, the first electronic device counted in the number, wherein:
the first input of the first logic gate is coupled to an input of the thermometer detector; and
a first input of the second logic gate is coupled to an output of the thermometer detector.

17. The system of claim 16, the first electronic device comprising an inverter coupled between the first capacitor and the first input.

18. The system of claim 16, the first electronic device comprising a transistor having a gate coupled to an output of the first logic gate and having a first source/drain region coupled to a node to which the first capacitor is coupled.

19. The system of claim 18, the first capacitor coupled between the node and a first voltage source.

20. The system of claim 19, a second source/drain region of the transistor coupled to a second voltage source different than the first voltage source.

* * * * *